UNITED STATES PATENT OFFICE.

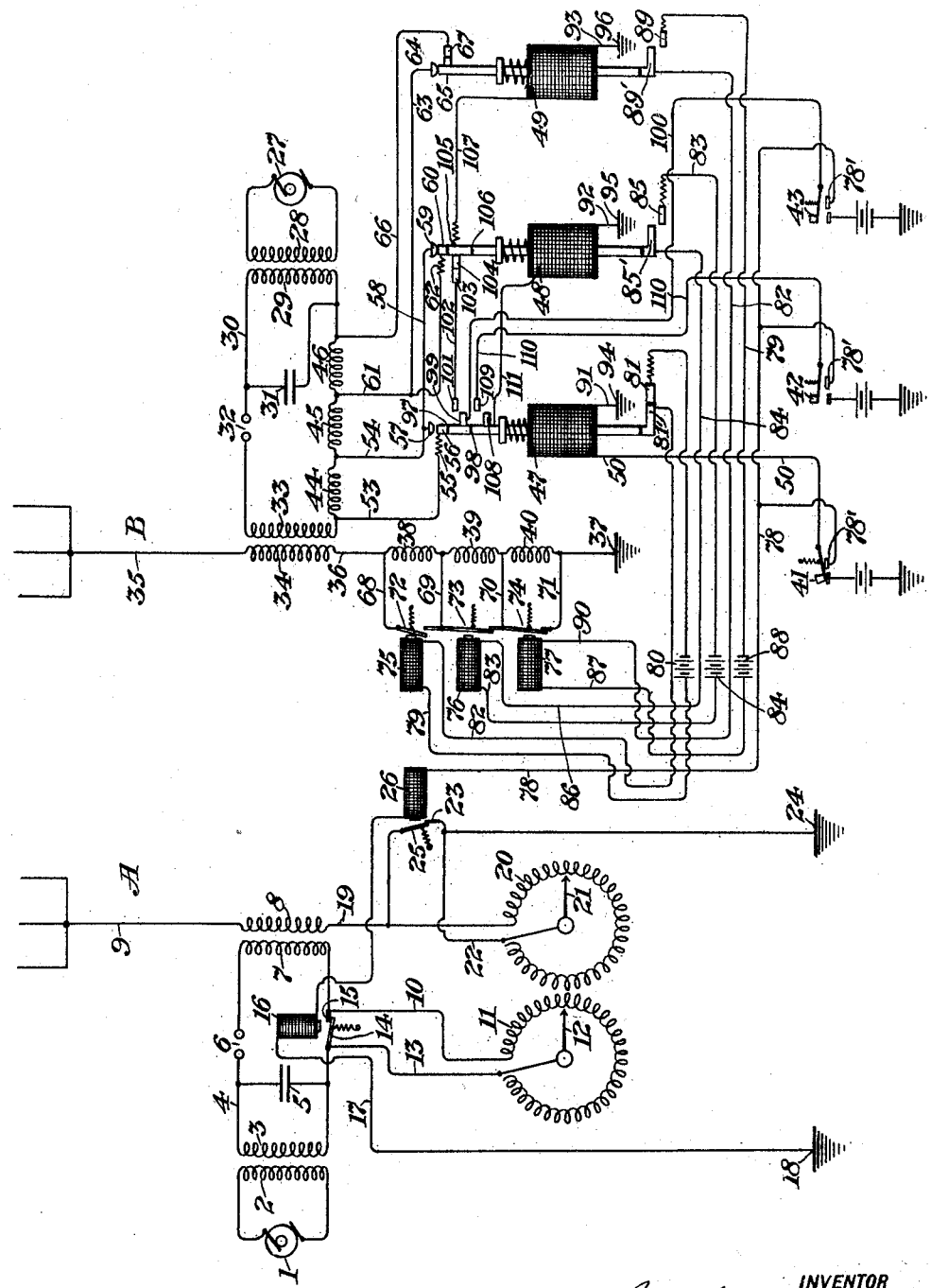

JOHN HAYS HAMMOND, JR., OF GLOUCESTER, MASSACHUSETTS.

SYSTEM OF RADIODYNAMIC CONTROL.

1,399,254.   Specification of Letters Patent.   Patented Dec. 6, 1921.

Application filed June 30, 1917, Serial No. 177,867. Renewed April 20, 1921. Serial No. 462,995.

*To all whom it may concern:*

Be it known that I, JOHN HAYS HAMMOND, Jr., a citizen of the United States and a resident of Gloucester, in the county of Essex and State of Massachusetts, have invented a certain new and useful Improvement in Systems of Radiodynamic Control, of which the following is a specification.

This invention relates to system for the control of distant bodies or mechanisms by radiant energy and particularly to such control through electromagnetic waves transmitted from a suitable control station.

In order that the principle of the invention may be readily understood, I have in the accompanying drawing diagrammatically represented one embodiment of a system for practising my invention and arranged to be controlled by electroradiant waves.

I shall, however, in the disclosed embodiment of my invention, represent means for transmitting electromagnetic waves. Any suitable means, apparatus or object may be controlled by the transmission of such waves, as, for example, a vehicle, an air craft or a vessel. I particularly contemplate the control of a vessel, such as a torpedo, and in the ensuing description shall generically refer to the controlled body as a torpedo.

In order to secure selectivity, I preferably equip each torpedo or other controlled body with means responsive to two different wave lengths or other characteristics or values and so constructed that the torpedo will respond only when both wave lengths are transmitted simultaneously or substantially so.

In the accompanying drawing, I have represented at a single control station two transmitting sets indicated generally at A and B. The transmitting set indicated at A is intended continuously to transmit different wave lengths or other characteristics through any suitable range in order to disturb the enemy and prevent them from tuning in to the specific and operative wave length, but is provided with means whereby the operator may at any desired time cause said transmitting set A to transmit only the specific or operative wave length. The transmitting set B is provided with means whereby it may emit any one of a series of operative wave lengths or other characteristics, and in the disclosed embodiment of the invention, I have shown means whereby any one of three wave lengths or characteristics may be transmitted simultaneously with the transmission by the set A of its specific or operative wave length or characteristic.

Assuming for the purpose of illustration that it is desired to control three torpedoes and that the specific wave length of the transmitting set A is three thousand meters and that the specific wave lengths of the transmitting set B are respectively two hundred, four hundred and seven hundred meters, it will be seen that I provide means whereby I may simultaneously transmit from the two transmitting sets A and B wave lengths of three thousand and two hundred meters, or wave lengths of three thousand and four hundred meters, or wave lengths of three thousand and seven hundred meters, whereby any one of the three torpedoes may be thus controlled.

Referring to the drawing, wherein I have disclosed one form of means for carrying out my invention and first to the transmitting set A, I have therein represented an alternator or other suitable source of energy at 1 in circuit with the primary 2 of a transformer, of which the secondary is indicated at 3 as in a closed oscillatory circuit 4, having a suitable condenser 5, spark gap 6 and primary 7, preferably of a suitable Tesla coil, the secondary whereof is indicated at 8 as forming part of the aerial or antenna 9. The oscillatory circuit 4 is in series by means of a conductor 10 with an inductance 11, in co-acting relation with which is a switch 12 preferably continuously rotated by a motor or in any other suitable manner, so as to vary the amount of inductance thereby thrown into the oscillatory circuit 4. Leading from the switch 12 is a conductor 13 having a switch 14 adapted to make suitable contact with a terminal 15. Mounted in suitable relation to the switch 14 is a magnet 16, and connected thereto is a conductor 17 leading to ground at 18. So long as the switch 14 is open, the inductance 11 or a portion thereof is in series with the inductance 7 of the oscillatory circuit 4, that is, a circuit exists through the inductance 7, the inductance 11, the switch 12, the condenser 5 and the spark gap 6. When, however, the magnet 16 is energized, the switch 14 is closed, and the entire inductance 11 is short circuited and will therefore have no effect upon and will not be included in the described circuit.

The aerial or antenna 9 is provided with a conductor 19 having a suitable inductance 20 in operative relation to which is a switch 21 adapted to be preferably continuously rotated by a motor or in any other suitable manner.

Leading from the rotary switch 21 is a conductor 22 having a terminal 23 and also leading to ground at 24. Said terminal 23 is adapted to make contact with a switch 25, and in operative relation to said switch 25 is a magnet 26 adapted to be energized as hereinafter set forth. So long as the switch 25 is open, the inductance 20 is in series with the aerial or antenna 9 and with the inductance 8 thereof and ground 24. When, however, the switch 25 is closed, the entire inductance 20 is short circuited and the ground 24 is connected directly with the inductance 8 of the aerial or antenna 9.

Normally the switches 12 and 21 are rotated in synchronism, and they thereby cause a constant variation of inductance to be thrown in series with the closed and open oscillatory circuits 4 and 9, excepting when the switches 14 and 25 are closed, in which case, the said inductances 11 and 20 become non-effective. The said inductances 11 and 20 are so designed and constructed that the individual inductances in the closed and open circuits are at all times maintained in specific relationship and the whole system is thereby maintained in resonance, inasmuch as the inductances 11 and 20 vary in determined relation with each other, so as to maintain such resonance.

Therefore, the transmitter A, so long as the inductances 11 and 20, or any portion thereof, are in series with the closed and open circuits, is sending out a wide range of different wave lengths in order to disturb the enemy and to prohibit the enemy from determining and tuning in to the specific and operative wave length, which is transmitted when the inductances 11 and 20 are short circuited. When the inductances 11 and 20 are short circuited, then the transmitter A emits a specific wave length which may be referred to for purposes of illustration as a wave length of three thousand meters.

The transmitting set B is provided with an alternator or other source of energy 27, in circuit with which is the primary 28 of a transformer, the secondary 29 of which forms a portion of the closed oscillatory circuit 30 having a condenser 31 and a spark gap 32. Said oscillatory circuit is also provided with the primary 33, preferably of a Tesla coil, the secondary 34 of which is in series with the aerial or antenna 35. A conductor 36 leads from the secondary 34 to ground at 37 and is provided with three inductances 38, 39 and 40.

The transmitting set B is provided with a plurality of control points or stations, herein indicated by keys 41, 42, 43, which are preferably located at different points along the coast overlooking the harbor entrances. In the represented embodiment of the invention, the control point 41 is located in the most important point strategically, the control point 42 in the next most important position and the control point 43 in the position of least importance strategically. In the closed oscillatory circuit 30 are provided three inductances 44, 45 and 46, which, as hereinafter set forth, are adapted to be thrown into the closed oscillatory circuit 30 by the keys at the control points 41, 42 and 43 respectively.

The inductances 38, 39 and 40 of the open oscillatory circuit are adapted respectively and singly to be thrown into such circuit simultaneously with the throwing into the closed oscillatory circuit 30 of inductances 44, 45 or 46, whereby the transmitting set B will emit a wave length which may be of two hundred, four hundred or seven hundred meters, depending upon which pair of inductances 38—44, 39—45 or 40—46 is thrown into series with the open and closed oscillatory circuits 35—30.

In order to throw the said inductances 38, 39, 40, 44, 45, 46 into the said open and closed oscillatory circuits 35, 30, I may provide any suitable means. Preferably, however, I employ three solenoids 47, 48, 49, the first of which, 47, is directly connected by a conductor 50 with the control key 41 but the second solenoid 48 is connected to the second key 42, through a circuit controlled by the first solenoids 47, while the third solenoid 49 is connected with the third key 43 through a circuit controlled both by the first solenoid 47 and the second solenoid 48, as will appear hereinafter. Leading from the inductance 44 are conductors 53, 54, the former of which is connected at 55 to the core or plunger 56 of the solenoid 47. The conductor 54 is provided with a stationary terminal 57, with which the said core or plunger 56 is adapted to make contact. The conductor 54 is continued as indicated at 58 and is provided with a stationary terminal 59, with which the core or plunger 60 of the solenoid 48 is adapted to make contact. Leading from the inductance 45 is a conductor 61 connected at 62 to the core 60 of the said solenoid 48. The conductor 61 is continued as indicated at 63, and is provided with a stationary terminal 64, with which the core or plunger 65 of the solenoid 49 is adapted to make contact. Leading from the inductance 46 is a conductor 66 having a stationary terminal 67 adjacent to said core or plunger 65.

The construction is such that so long as the solenoids 47, 48, 49 remain unenergized, the inductances 44, 45 and 46 are short circuited. Upon energizing the solenoid 47, its core 56 breaks contact with the terminal 57, and thereby throws the inductance 44 into the closed oscillatory circuit 30, and a certain specific wave length is emitted from the transmitter set B, as, for example, a wave length of two hundred meters. Similarly, by energizing the solenoid 48, the inductance 45 is thrown into the circuit 30, and by energizing the solenoid 49, the inductance 46 is thrown into the said circuit 30. In this manner, any one of three different wave lengths may be emitted by the transmitter set B.

In order that the closed oscillatory circuit 30 and the open oscillatory circuit 35 may be at all times maintained in resonance, I provide suitable means whereby when any one of the inductances 44, 45 and 46 is thrown into the closed oscillatory circuit 30, the corresponding inductance 40, 39 or 38 is thrown into the open oscillatory circuit 35. In order to effect this result, I have represented a conductor 68 leading from one side of the inductance 38, the conductor 69 leading from the opposite side thereof, a conductor 70 leading from the side of the inductance 39 opposite the conductor 69, and a conductor 71 leading from the side of the inductance 40 opposite the conductor 70. In operative relation with the said conductors, I have provided switches 72, 73 and 74, by which, when closed, the inductances 38, 39, 40 are short circuited. By opening any one of said switches, the corresponding inductance is thrown into series with the open oscillatory circuit 36. Three stationary electro-magnets 75, 76 and 77 are suitably positioned to control three switches 72, 73 and 74 respectively.

Leading from the magnet 26 of the transmitting set A is a conductor 78 which is connected to three stationary terminals 78' in coöperative relation with the three switches 41, 42 and 43 respectively. Leading from one end of the magnet 75 of the transmitting set B is a conductor 79 in circuit with a battery 80, and leading to a stationary terminal 81 with which a contact 81' carried by and insulated from the core 56 is arranged to make contact. The other end of the magnet 75 is connected by a conductor 82 to the contact 81'. Leading from one end of the magnet 76 is a conductor 83 in series with a battery 84 and extending to a stationary terminal 85 with which a contact 85' carried by and insulated from the core 60 is arranged to make contact. The other end of the magnet 76 is connected by a conductor 86 to the latter contact 85'. Leading from one end of the magnet 77 is a conductor 87 in series with a battery 88, and leading to a stationary terminal 89 with which a contact 89' carried by and insulated from the core 65 is arranged to make contact. The other end of the magnet 77 is connected by a conductor 90 to the latter contact 89'. The lower ends of the windings of the solenoids 47, 48, 49 are connected by conductors 91, 92, 93, to any suitable "ground" as at 94, 95, 96.

Means are provided whereby the control points 41, 42, 43 will have precedence in such sequence. That is to say, when the operator at the control point 41 is transmitting, the control points 42 and 43 are automatically cut out, and when the operator at the control point 42 is operating, the control point 43 is automatically cut out. At each of the control points 41, 42, 43, I provide a suitable receiver of radiant energy, so that the operator at control point 41 is able to hear the transmissions of the operator at control point 42 or of the operator at control point 43, so that he will not interrupt their signals by closing a circuit. Correspondingly the operator at the control point 42 will be able to hear transmissions of the operator at the control point 43.

I may provide any suitable means automatically to cut out all but a single transmitting station. For this purpose, I have, in this embodiment of the invention, represented the core 56 of the solenoid 47 as insulated at the points 97, 98, and leading from a projection 99 of said core between said points of insulation is a conductor 100, which is connected to the switch 43 of the solenoid 49. The projection 99 is adapted to make contact with a terminal 101, with which is connected a conductor 102 leading to and connected with the terminal 103, with which a projection 104 upon the plunger 60 is adapted to make contact. Said projection 104 is located between points of insulation 105 and 106 upon the said core 60, and leading from said core between said points of insulation is a conductor 107 connected to the solenoid 49. Beneath the point of insulation 98 upon the core 56 is a projection 108 adapted to make contact with the terminal 109, leading from which is a conductor 110, which, as shown, is connected to the switch 42 of the solenoid 48. Also leading from the said core 56 is a conductor 111, which leads to and is connected with the solenoid 48.

I have represented the key at the control point 41 as closed, thereby energizing the solenoid 47 and withdrawing its core or plunger 56 from the terminal 57. The inductance 44 is thereby thrown into the closed oscillatory circuit 30 and the switch 72 is opened, thereby throwing the inductance 38 into the open oscillatory circuit 35. The closing of the key at the control point 41 also results in the energization of the magnets 26 and 16 of the transmitter set A. Therefore, a specific wave length is transmitted from the transmitter set A and a certain specific wave length is also transmitted from the transmitter set B.

The energization of the solenoid 47 prevents the operators at the control points 42, 43 from transmitting. Energization of the solenoid 48 at the control point 42 is prevented at such time by reason of the fact that the projection 108 upon the core or plunger 56 is moved below and out of contact with the terminal 109, thereby breaking the circuit through the conductor 110. The solenoid 49 cannot at such time be energized from the control point 43, inasmuch as the downward movement of the core or plunger 56 upon energization of the solenoid 47 moves the projection 99 below the terminal 101, thereby breaking the circuit through the conductors 102, 107.

Correspondingly, if the solenoid 48 be energized by the operator at control point 42 (the operator at control point 41 not at such time transmitting), the core or plunger 60, shown elevated, is lowered, thereby breaking the contact with the terminal 59 and throwing the inductance 45 into the closed oscillatory circuit 30 and the inductance 39 into the open oscillatory circuit 35. The downward movement of said core or plunger 60 moves the projection 104 thereof below the terminal 103 and hence the circuit through conductor 107 is broken and the solenoid 49 therefore cannot be energized from the control point 43.

I have herein represented two main or central stations A and B and a plurality of local stations 41, 42, 43, each of which is adapted to control each of the main or central sets A, B.

The system herein disclosed particularly relates to the control of the movement of dirigible torpedoes from a series of stations, and it may be applied to the protection of harbors and coasts from hostile ships. The several control stations 41, 42 and 43 (the number of which may be widely varied within the scope of my invention with corresponding changes in the construction and arrangement of the transmitter sets A and B) may be positioned at more or less widely separated points along the coast or with relation to a single harbor or other points. The contour and topography of the coast may be such that from a single local station, it is impossible to observe torpedoes at various points at their field of maneuver. In such case, it is important that other local stations be provided from which the movement of the torpedo boats are visible and from which they may be properly directed.

Having thus described one illustrative embodiment of my invention, I desire it to be understood that although specific terms are employed, they are used in a generic and descriptive sense and not for purposes of limitation, the scope of the invention being set forth in the following claims.

Having thus described my invention, I claim as new and desire to protect by Letters Patent of the United States:

1. A system for the control of distant bodies by radiant energy comprising in combination, a central station including a closed oscillatory circuit and an open oscillatory circuit, each provided with a plurality of different inductance values that may be thrown into circuit and a corresponding plurality of local stations coöperatively associated with the central station and each having means whereby an inductance value characteristic of such local station may be thrown into each of said circuits.

2. A system for the control of distant bodies by radiant energy comprising in combination, a central station including a closed oscillatory circuit and an open oscillatory circuit, each having a plurality of different inductance values that may be thrown into circuit, solenoids adapted to control said inductance values and a series of local stations controlling respectively the energization of said solenoids.

3. A system for the control of distant bodies by radiant energy comprising in combination, a central station having a closed oscillatory circuit and an open oscillatory circuit, a series of inductance values that may be thrown in any desired sequence into said closed circuit, a plurality of local stations coöperatively associated with said central station, and means controlled respectively by said stations to change said inductance values and to preserve the syntony of the closed and open oscillatory circuits.

4. A system for the control of distant bodies by radiant energy comprising in combination, a central station having a series of inductance values, means normally short-circuiting said inductance values and means at each of a plurality of local stations to open the closed circuit pertaining to one of said inductance values, whereby the corresponding inductance is thrown into the circuit.

5. A system for the control of distant bodies by radiant energy comprising in combination, a central station having a closed oscillatory circuit and an open oscillatory circuit, each provided with a series of different inductance values, means to short-circuit each of said inductance values and a corresponding plurality of local stations having means respectively to open said short circuits and to maintain said oscillatory circuits in syntony.

6. A system for the control of distant bodies by radiant energy comprising in combination, a central station having a closed oscillatory circuit and an open oscillatory circuit, a series of inductance values that may be thrown into said closed circuit, a series of inductance values that may be thrown into said open circuit, short circuiting means for said respective inductance values, switches controlling the short circuits of said open oscillatory circuit, magnets controlling said switches, solenoids controlling the short circuits of the closed oscillatory circuit, and a corresponding series of local stations controlling the energizations of said magnets and solenoids.

7. A system for the control of distant bodies by radiant energy comprising in combination, two central stations, one of said stations having means for transmitting wave characteristics through an extended range but capable of transmitting a specific wave characteristic and the other station having means for effecting the emission of a series of electromagnetic waves of contrasting characteristics, a plurality of solenoids governing the emission of electromagnetic waves from said central stations, and a series of local stations corresponding in number to said solenoids and connected therewith, whereby there may be simultaneously emitted from said central stations electromagnetic waves, one of which has the specific characteristics of one of said central stations, and the other of which has a specific characteristic pertaining only to a single one of said local stations.

8. A system for the control of distant bodies by radiant energy comprising in combination, two interdependent central stations, each having a closed oscillatory circuit and an open oscillatory circuit, and means for varying simultaneously the inductance values of both oscillatory circuits at each station while maintaining said circuits respectively in syntony.

9. A system for the control of distant bodies by radiant energy comprising in combination, two interdependent central stations, each having a closed oscillatory circuit and an open oscillatory circuit, a plurality of local stations coöperatively associated with said central stations and means for simultaneously varying from each of said local stations the inductance values of the open and closed oscillatory circuits of each central station while maintaining said open and closed circuits respectively in syntony.

10. In a radio system, a main or central station provided with means for transmitting a plurality of series of waves of radiant energy having different characteristics respectively, of a plurality of interdependent independently operative devices arranged to cause said central station to produce said plurality of series, respectively.

11. In a radio system, the combination with means normally continuously operative to transmit radiant energy in the form of siren waves, of means for transmitting radiant energy periodically at selected intervals, and means controlled by said second mentioned means for rendering said first mentioned means temporarily inoperative while said second mentioned means is in operation.

12. In a radio system, the combination with means normally operative to transmit radiant energy in the form of siren waves, of means for transmitting radiant energy periodically at will to form a message or signal, means for varying the character of said periodically transmitted radiant energy in a predetermined manner, and means controlled by said periodically operated means for rendering said siren wave means inoperative while said message or signal is being transmitted.

In witness whereof I have hereunto set my hand this 11th day of June, 1917.

JOHN HAYS HAMMOND, Jr.